United States Patent
Reagan

(10) Patent No.: US 6,186,510 B1
(45) Date of Patent: Feb. 13, 2001

(54) MECHANICAL CONTACT BEARING SEAL

(75) Inventor: Michael P. Reagan, Greenwell Springs, LA (US)

(73) Assignee: Power Packing Company, Inc., Baton Rouge, LA (US)

(*) Notice: Under 35 U.S.C. 154(b), the term of this patent shall be extended for 0 days.

(21) Appl. No.: 09/163,530

(22) Filed: Sep. 30, 1998

Related U.S. Application Data

(63) Continuation-in-part of application No. 08/591,980, filed on Jan. 30, 1996, now abandoned.

(51) Int. Cl.[7] .................................................. F16J 15/34
(52) U.S. Cl. .......................... 277/371; 277/372; 277/375; 277/379
(58) Field of Search .................................. 277/370, 371, 277/372, 373, 374, 375, 379

(56) References Cited

U.S. PATENT DOCUMENTS

| | | | |
|---|---|---|---|
| 2,844,393 | 7/1958 | Jensen | 286/11.14 |
| 3,026,114 | 3/1962 | Andersen et al. | 277/68 |
| 3,070,378 | * 12/1962 | Bojako et al. | 277/372 |
| 3,116,066 | 12/1963 | Koppius | 277/38 |
| 3,129,964 | 4/1964 | McNeil | 285/369 |
| 3,410,566 | 11/1968 | Wiese | 277/81 |
| 3,672,689 | * 6/1972 | Hadley | 277/373 |
| 3,762,727 | 10/1973 | Jackowski | 277/41 |
| 3,799,559 | 3/1974 | Kayser | 277/41 |
| 4,377,290 | * 3/1983 | Netzel | 277/374 |
| 4,434,986 | 3/1984 | Warner | 277/42 |
| 4,580,790 | 4/1986 | Doose | 277/228 |
| 4,639,000 | * 1/1987 | Warner | 277/373 |
| 4,655,462 | 4/1987 | Balsells | 277/164 |
| 4,826,144 | 5/1989 | Balsells | 267/167 |
| 4,830,344 | 5/1989 | Balsells | 267/167 |
| 4,906,008 | 3/1990 | Warner | 277/40 |
| 4,915,366 | 4/1990 | Balsells | 267/167 |
| 5,108,078 | 4/1992 | Balsells | 267/167 |
| 5,116,066 | * 5/1992 | Crawford | 277/372 |
| 5,139,276 | 8/1992 | Balsells | 277/163 |
| 5,292,137 | 3/1994 | Simmons et al. | 277/1 |
| 5,354,070 | 10/1994 | Carmody | 277/9 |
| 5,409,240 | 4/1995 | Ballard | 277/38 |

OTHER PUBLICATIONS

"Unilab Bearing Protection Company, Inc. presents its . . . P636S Series Positive Bearing Isolator" Apr. 1993, 3 pages.
Innovative Technology for Rotating Equipment, "Introducing the Inpro/Seal RMS–700 (which has no springs)" 2 pages undated.
Chesterton GBS Gear Box Seal, Jul. 1992, 3 pages.
Bal Seal Canted Coil Springs, Circular and Spring Lengths for Radial and Axial Loading, Catalog No. 3.IE, 8 pages, undated.
The BGM Dura Seal Magnetic Seal Bearing Protection, "It's the Most Technically Advanced and Reliable Bearing Protection Available Today for Your Rotating Equipment", 1989, 4 pages.
Chesterton Bearing Protection, "Break the cycle of lip seal related downtime! Extend pump MTBF", ISO 9001 Certified, Jun. 1994, 6 pages.

* cited by examiner

*Primary Examiner*—Daniel G. DePumpo
(74) *Attorney, Agent, or Firm*—Sieberth & Patty, L.L.C.

(57) ABSTRACT

A mechanical face-type seal assembly which provides substantially annular, axially biasing force along the annular seal created between the rotary seal face and the stationary seal face of the seal assembly. The device preferably employs a substantially annular segment of interconnected canted coils in conjunction with a cartridge-type configuration to provide substantially annular, axial biasing force to the rotary and stationary seal faces, while also providing an improved configuration for maintaining the sealing rings and interconnected canted coils in axial alignment and installing the entire assembly as a single cartridge on a variety of applications.

11 Claims, 7 Drawing Sheets

MECHANICAL CONTACT BEARING SEAL

REFERENCE TO RELATED APPLICATION

This is a continuation-in-part of U.S. Ser. No. 08/591,980 filed on Jan. 30, 1996 now abandoned.

TECHNICAL FIELD

This invention relates to mechanical face-type shaft seal assemblies.

BACKGROUND

Pumps, motors and other devices which employ a shaft rotatable within or on a bearing often require resilient seals between the shaft and the bearing housing through which the shaft extends. Besides a portion of the rotatable shaft and the bearing itself, the bearing housing contains lubricant to reduce friction within the bearings. Operating conditions may require that the seal between the shaft and the bearing housing inhibit water, air, dirt particles or other foreign objects from contaminating or otherwise deteriorating the lubricant content of the bearing housing. In mechanical seals, the seal between the shaft and the bearing housing usually is provided by two resilient sealing faces in rotatable and sealing relation with one another, one face being stationary relative to the shaft, and the other being in rotational engagement with the shaft.

Given the rotational relationship between the stationary face and the rotary face, a biasing force is usually required to maintain the seal. Various configurations providing for, among other things, biasing force within a mechanical face-type seal assembly are known in the art. For example, U.S. Pat. No. 4,906,008 to Warner describes a seal assembly employing a wave spring, while use of leaf springs and compression springs have also been described, for example, in U.S. Pat. No. 3,799,559 to Kayser and in U.S. Pat. No. 2,844,393 to Jansen, respectively. The use of interconnected canted coils in lip seals has been described in U.S. Pat. No. 4,655,462 to Balsells.

Notwithstanding developments in the prior art, a need continues to exist for a mechanical face-type seal assembly which provides an improved substantially annular biasing force to the sealing faces of a mechanical face-type seal assembly. Prior art configurations provided biasing force at only selected points along the annular surface of the seal faces, often times resulting in uneven wear and increasing the likelihood of leakage at the junction of the sealing faces. As will be further discussed below, so far as is known, cartridge-type configurations have heretofore been unknown in seal assemblies used in bearing housing shaft apertures, especially when relatively thin and/or relatively short assemblies are required. Accordingly, a need also exists for a mechanical face-type seal which has a cartridge-type configuration. Additionally, a need persists for a mechanical face-type seal assembly which can be relatively thin (about 0.15 to about 0.25 inch) in cross-section width, i.e., in a direction transverse to the axis of the shaft, and/or relatively short (about 0.625 to about 0.875 inch) in cross-section length, i.e., in a direction parallel to said axis, and yet has a cartridge-type configuration. As used herein, the term "cartridge" or "cartridge-type configuration" means a configuration of multiple and separate parts which may be installed as a single, preassembled unit.

SUMMARY OF THE INVENTION

In one of its embodiments, this invention provides an improved mechanical face-type seal assembly which fulfills the need for a substantially annular, axially biasing force along the annular seal created between the rotary seal face and the stationary seal face in a mechanical seal. Preferably, the device combines the substantially annular, axial biasing force of biasing means in the form of annularly disposed interconnected canted coils with a mechanical seal assembly employing a rotary seal face and a stationary seal face. The device of this invention also provides a cartridge-type configuration for maintaining the sealing rings and the interconnected canted coils in axial alignment with one another, and for easily installing the entire seal assembly as a single cartridge on a variety of applications.

More particularly, this invention provides, inter alia, a mechanical face-type seal assembly for sealing space between a bearing housing wall and a rotatable shaft which extends through an aperture in the housing wall, comprising (a) a stationary seal ring having a radially extending axially facing stationary seal face; (b) a rotary seal ring rotatable relative to the stationary seal ring and having a radially extending axially facing rotary seal face; (c) biasing means (preferably in the form of a substantially annular segment of interconnected canted coils); and (d) a seal housing substantially encasing the seal rings and sized and configured to be placed around the shaft and nonrotatably inserted into the aperture, thereby creating a seal between the seal housing and the bearing housing wall, the biasing means also being disposed within the seal housing to produce a biasing force to urge and maintain the seal faces in sealing contact with each other.

Another embodiment of this invention further includes first elastomeric means annularly disposed within an inner O-ring groove in the inner diameter of the rotary seal ring for maintaining a seal between the rotary seal ring and the rotatable shaft, and second elastomeric means annularly disposed within an outer O-ring groove in the perimeter of the stationary seal ring and within the seal housing for maintaining a seal between the stationary seal ring and the seal housing.

In a Preferred Embodiment, the Seal Housing Further Comprises (a) an inner stationary housing ring including (i) an axially extending first annular wall having a free end and a connecting end, (ii) a radially extending second annular wall which is connected at one end to the connecting end of and substantially perpendicular to the first annular wall, thereby creating inner and outer surfaces of the inner stationary housing ring, (iii) first annular race means proximate to the free end for rotatably interlocking the inner stationary housing ring with an outer rotary housing ring described below, (iv) retaining means at the second annular wall for retaining the segment of interconnected canted coils in annular alignment with the seal rings; and (v) an annular outer surface recess within the portion of the outer surface formed by the first annular wall proximate to the connection between the first and second walls to facilitate insertion of the assembly into the aperture; and (b) an outer rotary housing ring including (i) attachment means for detachably attaching the outer rotary housing ring to the rotatable shaft, (ii) a radially extending axially facing connecting face having engaging means for engaging the rotary seal ring in unified rotational relationship with the outer rotary housing ring, and (iii) a first axially extending radially facing outer face having second annular race means for cooperating with the first race means and rotatably interlocking the housing rings.

In Another Preferred Embodiment, the Seal Housing Further Comprises a) an inner stationary housing ring including (i) an axially extending first annular wall having a free end and a connecting end, the free end being beveled at its most axial edge, and having proximate to the free end one or more evenly and annularly displaced apertures therethrough, (ii) a radially extending second annular wall which is connected at one end to the connecting end of and substantially perpendicular to the first annular wall, thereby creating inner and outer surfaces of the inner stationary housing ring, and (iii) retaining means at the second annular wall for retaining the segment of interconnected canted coils in annular alignment with the seal rings; and (iv) an annular outer surface recess within the portion of the outer surface formed by the first annular wall proximate to the connection between the first and second walls to facilitate insertion of the assembly into the aperture; and b) an outer rotary housing ring including (i) attachment means for detachably attaching the outer rotary housing ring to the rotatable shaft and, when not installed, for attaching the free end to the outer rotary housing ring, (ii) a radially extending axially facing connecting face having engaging means for engaging the rotary seal ring in unified rotational relationship with the outer rotary housing ring.

Another preferred embodiment calls for the stationary seal ring to further comprise (a) a seal face insert ring which includes the radially extending axially facing stationary seal face and a radially extending axially facing insertable face opposite the stationary seal face and beveled at both annular edges, and (b) a seat ring which includes the outer O-ring groove and an annular channel for nonrotatably receiving the insert ring with the insertable face abutting the annular channel, the channel being of such a depth so as to permit the stationary seal face, when installed, to axially extend from the seat ring, thereby forming a seal plateau.

The device of this invention also provides for an improvement in a mechanical face-type seal assembly wherein a rotary seal ring and a stationary seal ring are disposed with radially extending faces in sealing relation, the rotary and stationary seal rings being biased together to maintain a seal at the junction of the faces, the improvement comprising at least one substantially annular segment of interconnected canted coils annularly aligned with the seal rings to produce a biasing force sufficient to maintain a seal at the junction of the faces.

In another of its embodiments, this invention fulfills the need referred to above for a mechanical face-type seal which not only is highly efficient under service conditions but which also has a cartridge-type configuration and thus is capable of being installed easily and quickly in bearing housings. Accordingly, this invention also provides a method of installing a mechanical face-type seal into the annular space between a bearing housing wall and a rotatable shaft extending through an aperture in the wall, the method comprising inserting into the space a preassembled cartridge-type mechanical face-type seal assembly which comprises a stationary seal ring having a radially extending axially facing stationary seal face, a rotary seal ring rotatable relative to the stationary seal ring and having a radially extending axially facing rotary seal face, biasing means, and a seal housing substantially encasing the seal rings and sized and configured to be placed around the shaft and nonrotatably inserted into the aperture, thereby creating a seal between the seal housing and the bearing housing wall, the biasing means being disposed within the seal housing and aligned with the rings to produce a biasing force to urge and maintain the seal faces in sealing contact with each other. The biasing means in embodiments of this invention may take the form of a number of resilient means, including, for example, compression springs, wave springs, rubber rings, and substantially annular interconnected canted coils, the last example being preferred.

These and other embodiments and features of the invention will become still further apparent from the ensuing description, appended claims and accompanying drawings.

BRIEF DESCRIPTION OF THE DRAWINGS

In the drawings, like numerals are used to refer to like parts among the several views.

FURTHER DESCRIPTION OF THE INVENTION

As noted earlier, this invention provides for a mechanical face-type seal assembly which employs interconnected canted coils to provide annularly disposed axially biasing force to maintain the assembly's rotary and stationary seal faces in sealing relation. The invention also provides for a cartridge-type configuration which may be adapted for a variety of embodiments, including those which are relatively thin and/or relatively short in cross-section.

Figure 1:
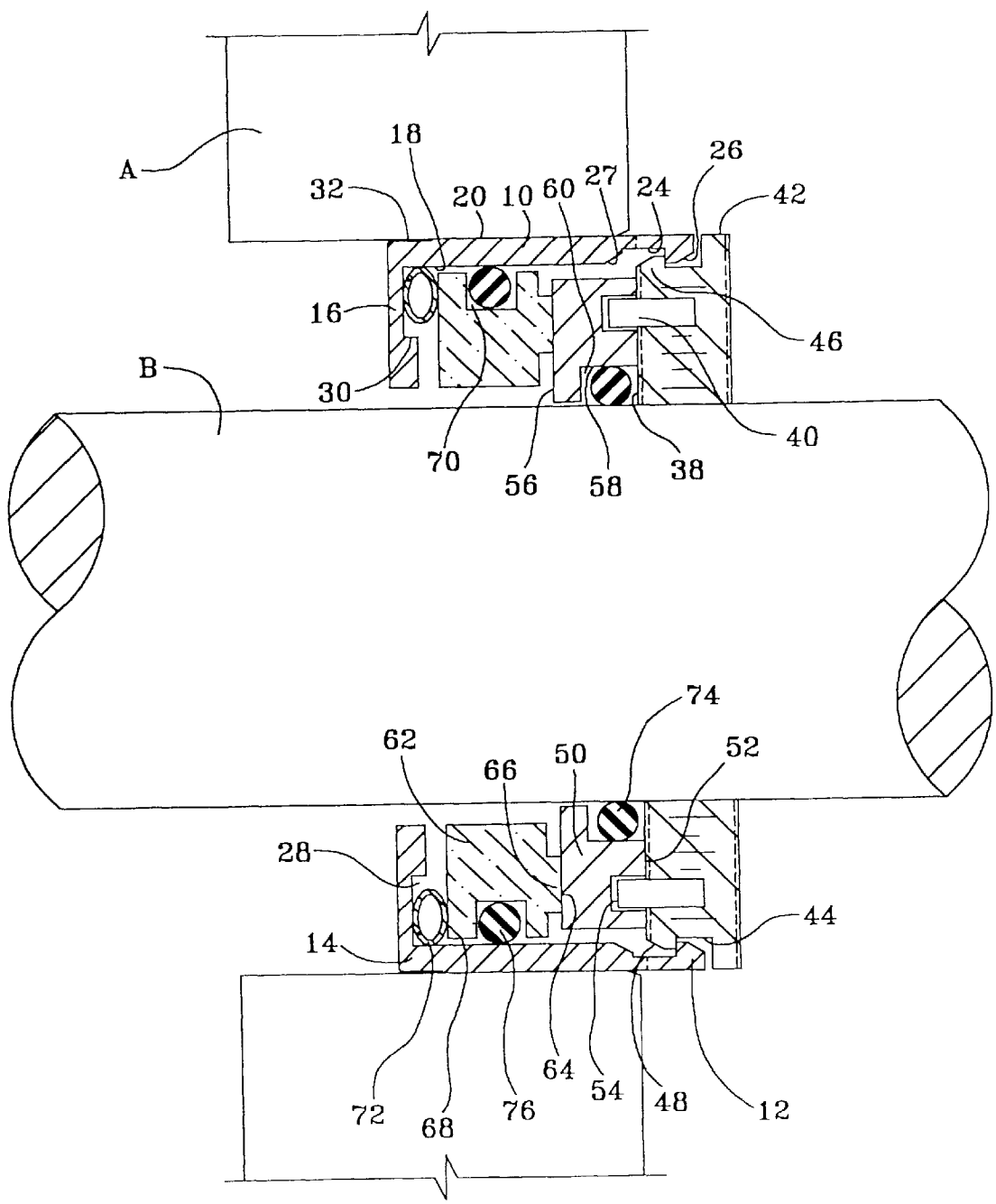
FIG. 1 is a view in cross-section of one embodiment of this invention.
Figure 2:
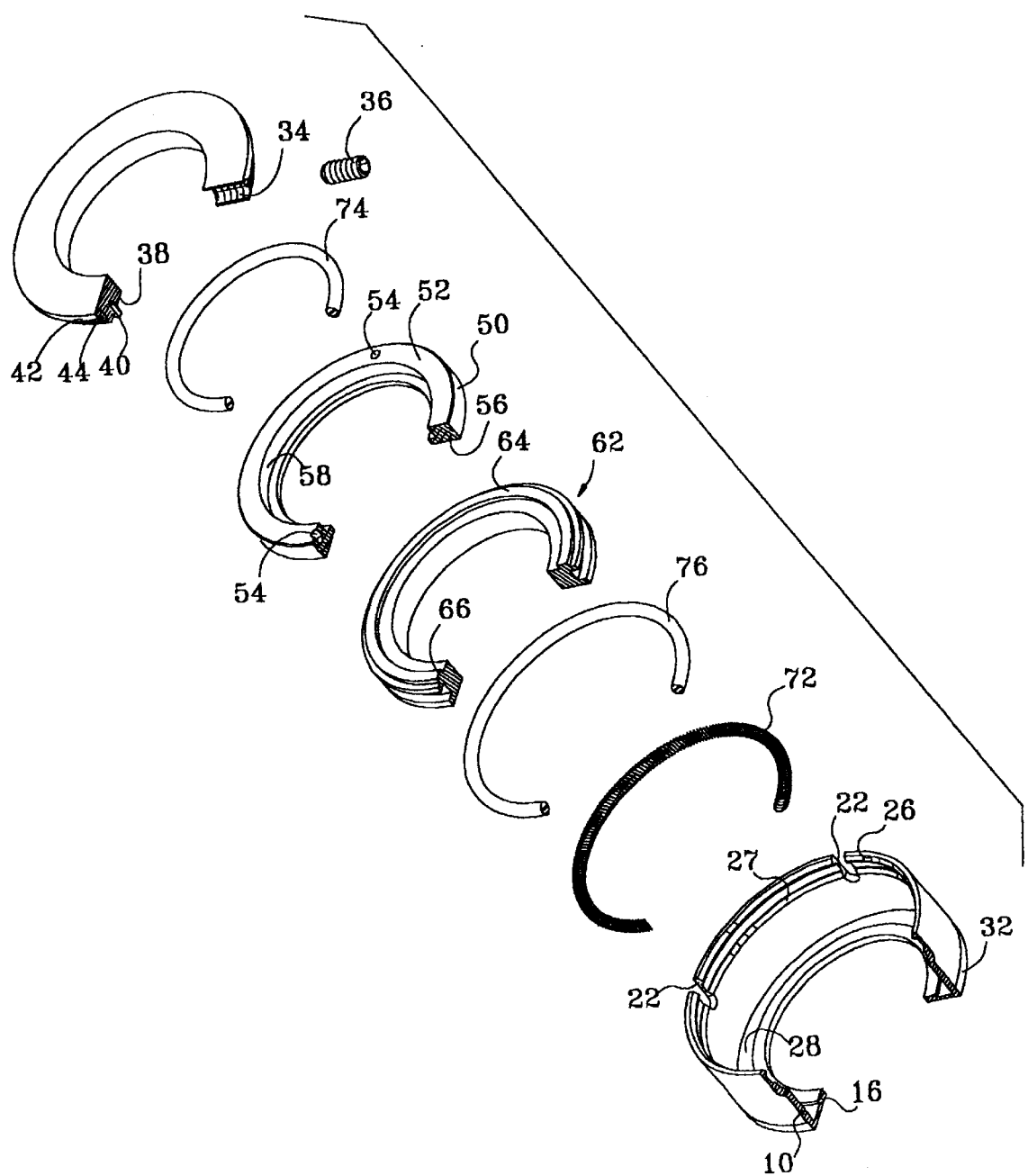
FIG. 2 is a an exploded view in perspective of the embodiment illustrated in FIG. 1 partially broken away.
Figure 3:
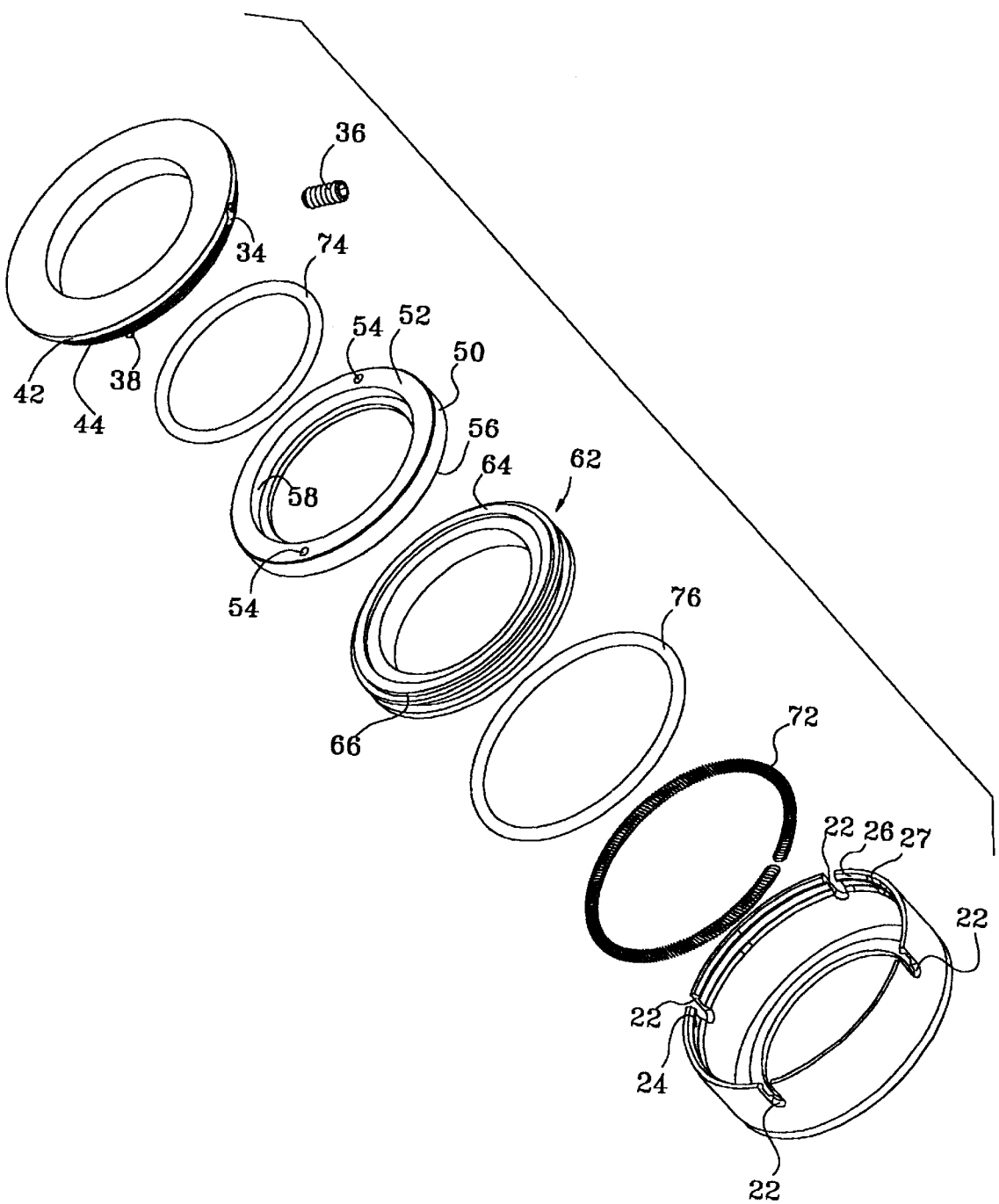
FIG. 3 is an exploded view in perspective of the embodiment illustrated in FIG. 1.

Referring now to the drawings, FIGS. 1, 2 and 3 illustrate a preferred embodiment of the invention. When operative, the device fits between a bearing house wall A and a rotatable shaft B, as shown in FIG. 1. The device itself includes an inner stationary housing ring comprised of an axially extending first annular wall 10 which has a free end 12 and a connecting end 14, and a radially extending second annular wall 16 which is connected at one end to connecting end 14 and is substantially perpendicular to first annular wall 10, thereby creating an inner surface 18 and an outer surface 20 of the stationary housing ring. Free end 12 has therein a plurality of evenly and annularly displaced passageways in the form of notches 22 (seen on FIGS. 2 and 3), as well as an annular inner surface groove 24 proximate thereto. The walls of annular inner surface groove 24 are beveled at their respective corners 26 and 27 proximate to free end 12 at substantially equal pitch. The stationary housing ring also includes an annular inner surface recess 28 formed on one side by first annular wall 10 and on the other side by a step 30 along the portion of said inner surface formed by second annular wall 16. An annular outer surface recess 32 is provided within the portion of outer surface 20 formed by first annular wall 10 and proximate to the connection between walls 10 and 16 to facilitate insertion of the assembly into an aperture in bearing housing wall B and create a seal between outer surface 20 and housing wall A.

The device further comprises an outer rotary housing ring which includes a threaded radially extending aperture 34 (seen on FIGS. 2 and 3) for receiving a threaded Allen screw 36 accessed through one of the notches 22, screw 36 being sized and configured to attach the outer rotary housing ring to rotatable shaft B without radially extending beyond the smallest outer diameter of the outer rotary housing ring. The outer rotary housing ring also has a radially extending axially facing connecting face 38 having a plurality of studs 40 axially extending therefrom, and a first axially extending radially facing outer face 42 having an annular outer surface groove 44 defined in part by a truncated, beveled groove wall 46 proximate to connecting face 38 and beveled at a corner 48 opposite outer surface groove 44 for providing a snap fit between outer surface groove 44 and annular inner surface groove 24 and interlocking the inner and outer housing rings so that the inner stationary housing ring and outer rotary housing ring may be axially interlocked while remaining rotatable relative to one another. It will also be appreciated that, when screw 36 is not completely installed and extends at least partially through one of notches 22 and through aperture 34, the inner and outer housing rings may be detachably connected so as to be both axially due to the snap fit between grooves 44 and 24 and the connection between the inner and outer housing rings provided by screw 36 and rotatably interlocked.

A rotary seal ring 50 concentric with and disposed within the inner stationary housing ring is also provided. Rotary seal ring 50 includes a radially extending axially facing receiving face 52 having a plurality of bores 54 for receiving studs 40 and engaging rotary seal ring 50 in unified rotational relationship with the outer rotary housing ring, a radially extending axially facing rotary seal face 56 opposite receiving face 52, and an axially extending radially facing inner face 58 which is stepped such that, when receiving face 52 and connecting face 38 are engaged with one another, connecting face 38 and inner face 58 define an inner O-ring groove 60. A stationary seal ring 62 is concentric with and disposed within the inner stationary housing ring and has a radially extending axially facing stationary seal face 64 which is stepped to form a seal plateau 66. Stationary seal ring 62 also has a second axially extending radially facing outer face 68 having therein an outer O-ring groove 70. Biasing means in the form of a substantially annular segment of interconnected canted coils 72 contact stationary seal ring 62 on a side opposite stationary seal face 64 and are retained in annular alignment with seal rings 50 and 62 by annular inner surface recess 28 to produce biasing force such that rotary seal face 56 and stationary seal face 64 are axially urged into and maintained in sealing relation with each other. First elastomeric means in the form of an O-ring 74 is disposed within inner O-ring groove 60 for maintaining a seal between rotary seal ring 50 and rotatable shaft B, and second elastomeric means in the form of an O-ring 76 is disposed within outer O-ring groove 70 for maintaining a seal between stationary seal ring 62 and the inner stationary housing ring.

The embodiment of FIGS. 1–3 is particularly well suited for seal assemblies which are about 0.15 to about 0.25 inch in cross-section width (i.e., radial thickness) and/or about 0.625 to about 0.875 inch in cross-sectional length (i.e., axial length) and configured to receive shafts of from about 0.75 to about 1.25 inches in diameter. In this way, heat generated by the contact points between the housing rings during operation is kept to a minimum.

Figure 4:
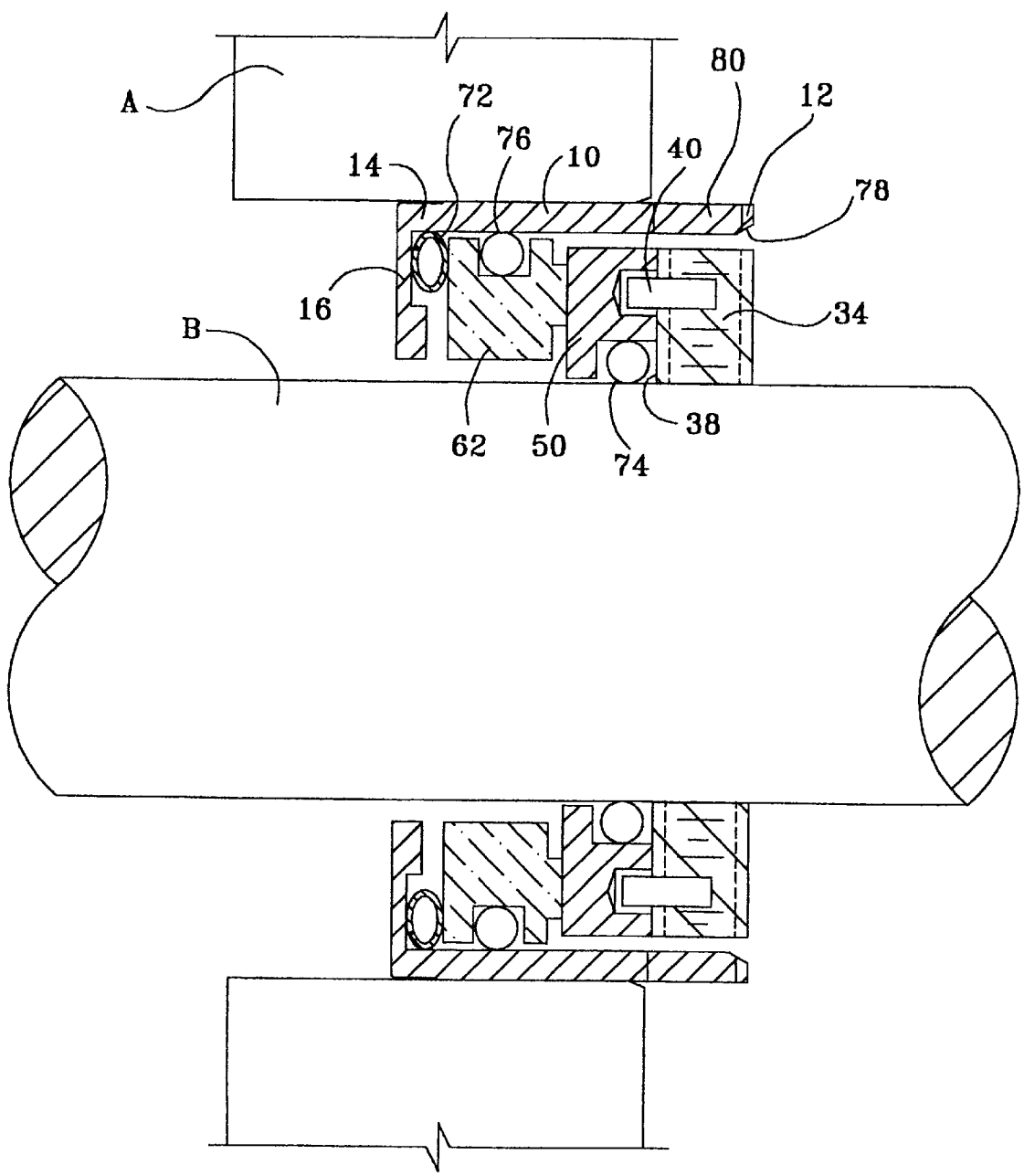
FIG. 4 is a view in cross-section of a second embodiment of this invention.
Figure 5:
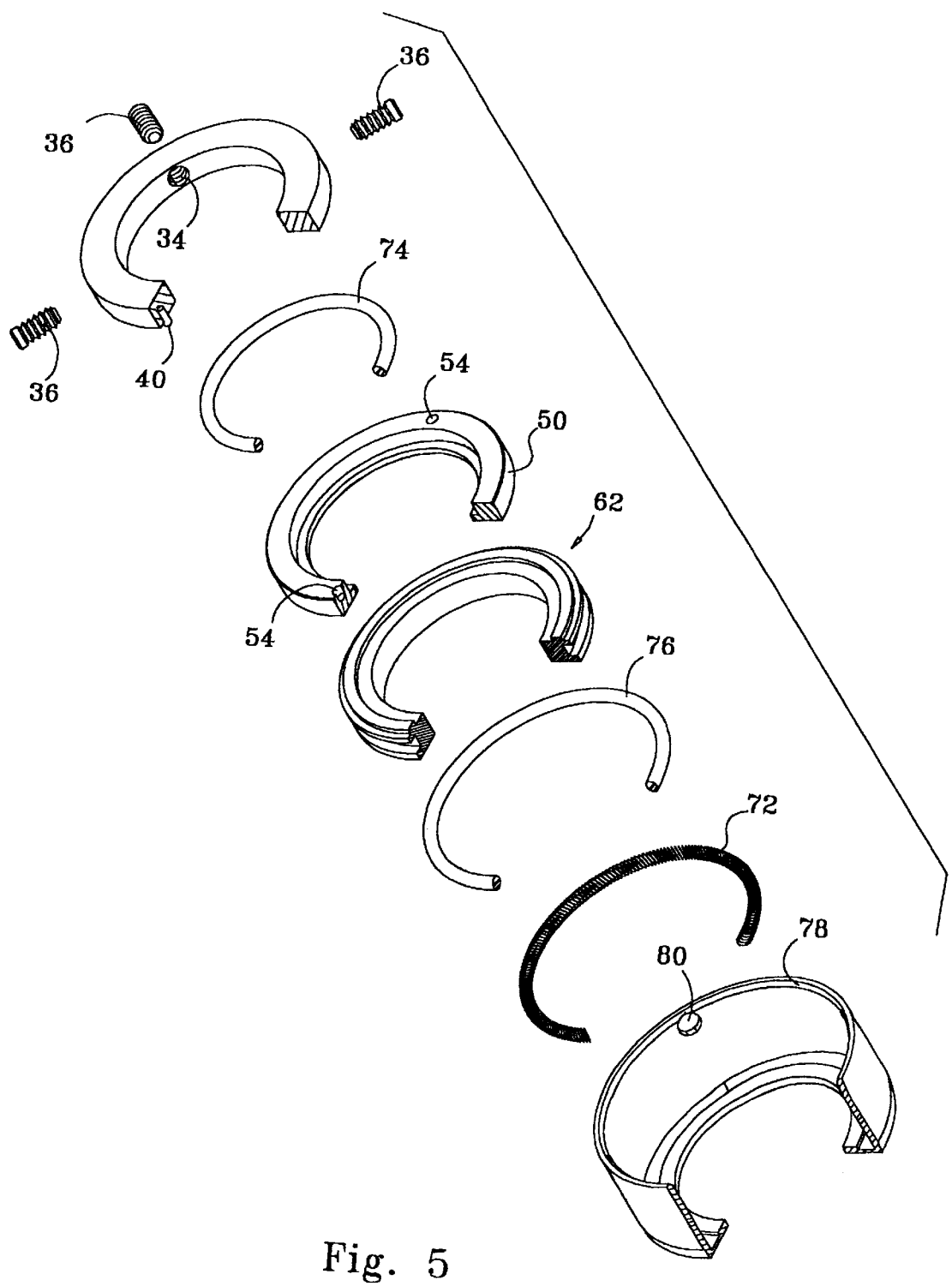
FIG. 5 is a an exploded view in perspective of the embodiment illustrated in FIG. 4 partially broken away.

FIGS. 4 and 5 illustrate another preferred embodiment which is similar in configuration to the embodiment illustrated in FIGS. 1–3, except that the inner and outer housing rings are modified. The inner stationary housing ring includes first annular wall 10 with free end 12 and connecting end 14, but the ring is beveled at the most axial edge 78 of free end 12 and has proximate to free end 12 a plurality of evenly and annularly displaced passageways in the form of apertures 80 (only 1 illustrated). The outer rotary housing ring of this device has also been modified to include a plurality of threaded radially extending apertures 34 (only 1 illustrated) for receiving a plurality of threaded Allen screws 36 through annularly displaced apertures 80, screws 36 being sized and configured to attach the outer rotary housing ring to rotatable shaft B when in an installed position and, when in an uninstalled position, to be partially extendable through annularly displaced apertures 80 and radially extending apertures 34, thereby detachably connecting the two housing rings. As with the first embodiment, the outer housing ring also includes connecting face 38 with studs 40 axially extending therefrom.

The embodiment of FIGS. 4 and 5 is particularly well suited for seal assemblies which are configured to receive shafts of from about 3 to about 7 inches in diameter. However, the device may be employed on shafts of smaller and larger diameters.

Figure 6:
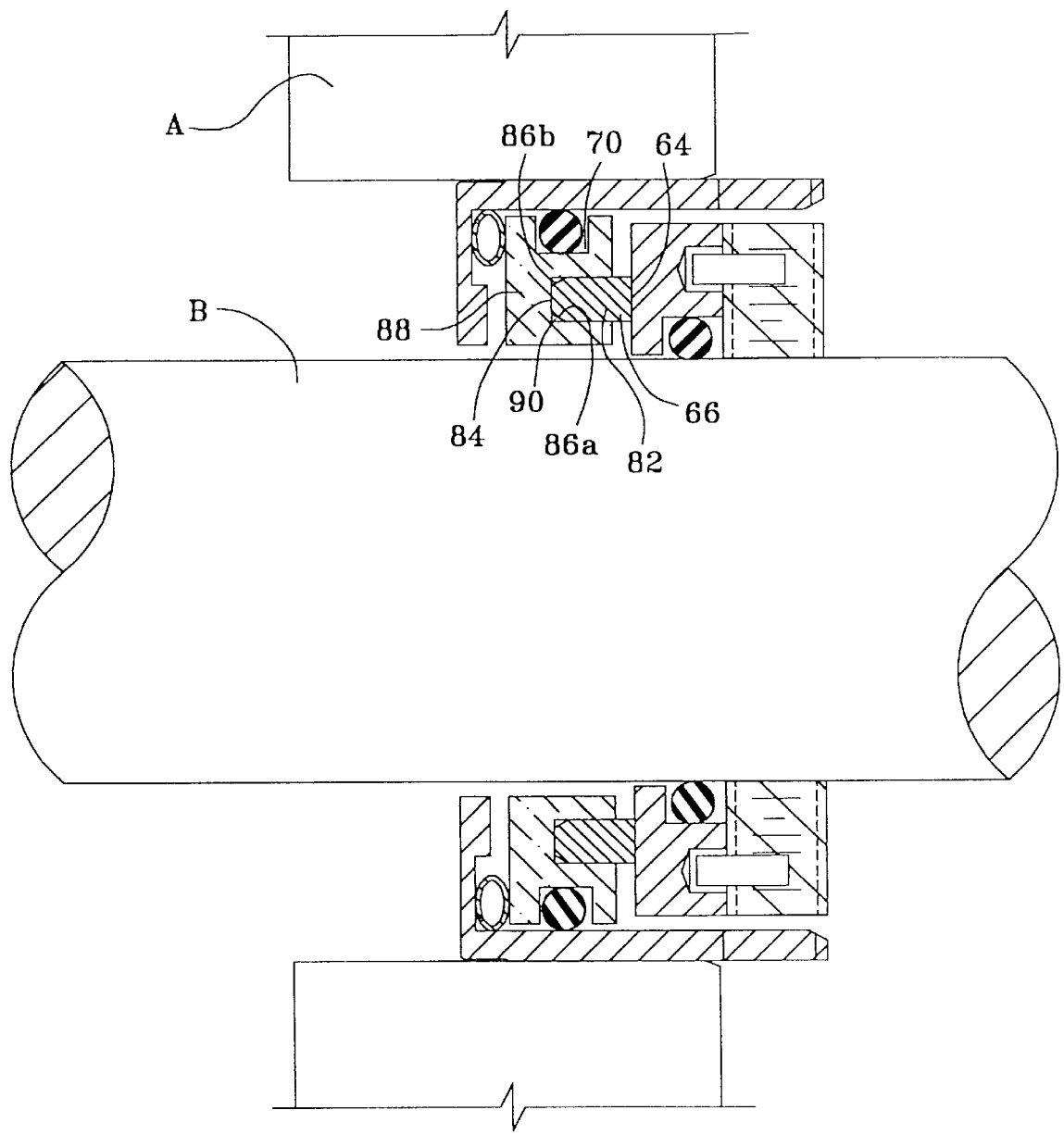
FIG. 6 is a view in cross-section of a third embodiment of this invention.
Figure 7:
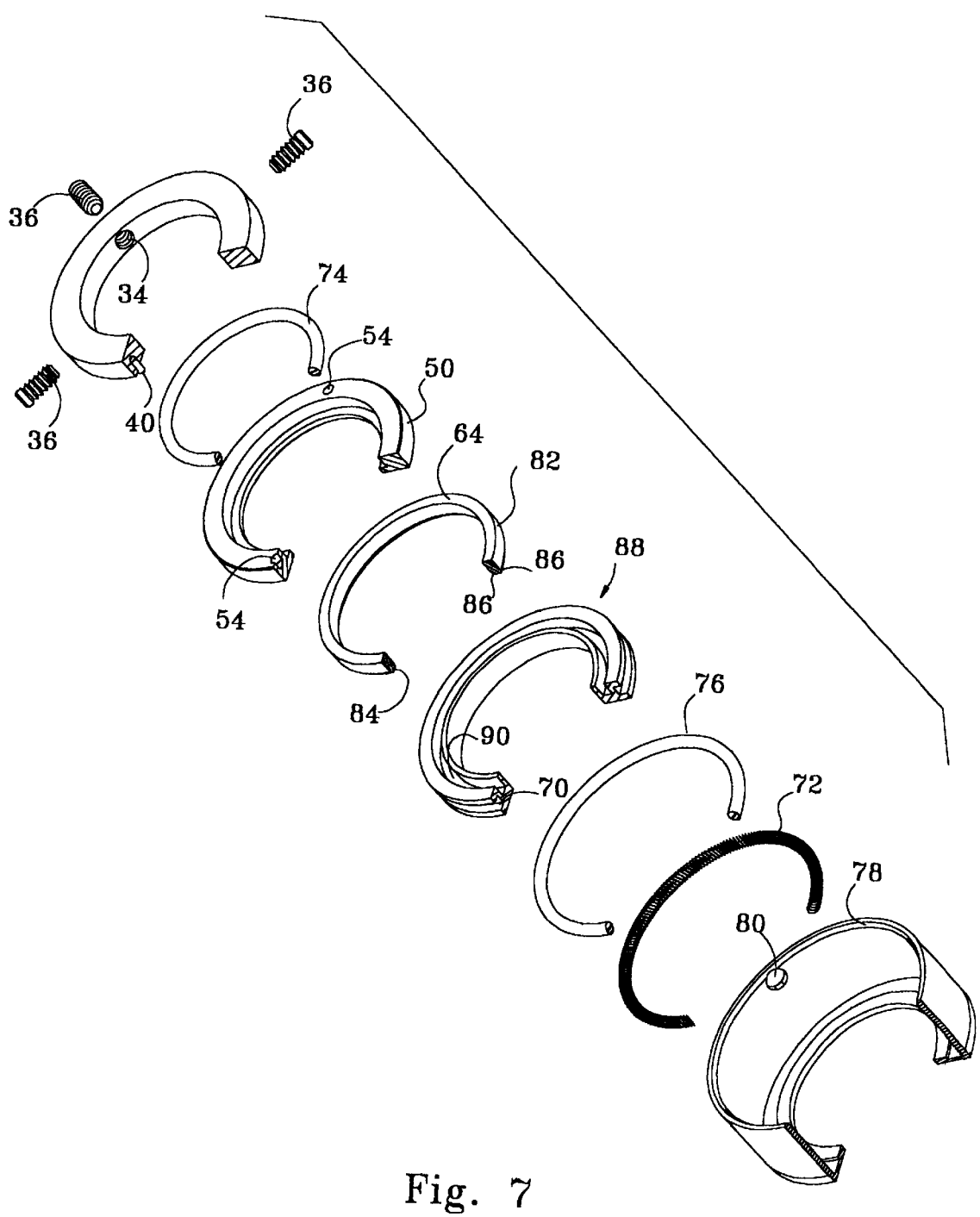
FIG. 7 is a an exploded view in perspective of the embodiment illustrated in FIG. 6 partially broken away.

FIGS. 6 and 7 illustrate yet another preferred embodiment which is most similar to the second illustrated embodiment of FIGS. 4 and 5. The difference lies in modifications to stationary seal ring 62, which is divided into two components in this embodiment. In this embodiment, stationary seal ring 62 comprises a seal face insert ring 82 which includes stationary seal face 64 and a radially extending axially facing insertable face 84 opposite stationary seal face 64 and beveled at both annular edges 86*a* and 86*b*, and a seat ring 88 which includes outer O-ring groove 70 and an annular channel 90 for nonrotatably receiving insert ring 82 with insertable face 84 abutting annular channel 90, said channel being of such a depth so as to permit stationary seal face 64, when installed, to axially extend from seat ring 88, thereby forming seal plateau 66.

The embodiment of FIGS. 6 and 7 is particularly well suited for seal assemblies which are configured to receive shafts of from about 1.125 to about 3 inches in diameter. However, the device may be employed on shafts of smaller and larger diameters.

The housing rings and rotary seal ring of the device of this invention may be fabricated from a variety of materials, including stainless steel, brass, other metal alloys and resilient plastics. Preferred materials include 303 stainless steel for the inner stationary housing ring, and either 303 stainless steel or 17-4-PH stainless steel for the outer rotary housing ring and rotary seal ring. The interconnected canted coils typically used in the practice of this invention will be a segment which is retained in a substantially annular position by the device itself, although a completely annular ring of interconnected canted coils may also be employed. When a segment of coils is employed, the segment is preferably long enough to form anywhere from about 315 to about 360 degrees of a complete circle while in an operative position. Again, the coils may be fabricated from an number of resilient materials, including, for example, 302 or 303 stainless steel. The elastomeric means employed in the device may be O-rings or other suitable elastomeric materials which can provide a seal. However, conventional O-rings fabricated with standard rubber compositions are preferred. The Allen screws utilized in preferred embodiments also may be fabricated from a variety of materials, including stainless steel, brass, other metal alloys and resilient plastics. The number of screws used may vary depending upon the shaft diameter. In preferred embodiments for smaller shaft sizes (about 0.75 to about 1.25 inches), one Allen screw is preferred, while anywhere from four to eight screws is preferred in embodiments for larger shaft sizes. With regard to each component of this device, the particular material used to fabricate a particular component may vary depending upon the use to which the device will be put.

In particularly preferred embodiments for shaft diameters of from about 0.5 to about 3 inches, the stationary seal ring, or in configurations only the seal face insert ring component of the stationary seal ring, is fabricated from a carbon and ceramic impregnated fluoropolymer. In this way, the stationary seal face is composed entirely of carbon and ceramic impregnated fluoropolymer, thereby producing a minimal amount of friction-generated heat and a durable wear surface which maintains its original flat surface characteristics. A suitable carbon and ceramic impregnated fluoropolymer is commercially available under the trade name CERLON from Four B Plastics Inc., 12558 South Choctaw Drive, Baton Rouge, La. 70815. According to the manufacturer's specifications, CERLON has the following non-limiting physical characteristics: filler content of 30% by weight, service temperature of 500° F., specific gravity of 2.05 grams/cc, tensile strength at break of 2.2 psi, elongation at break of 60%, deformation under 190 psi load of 3.9% parallel to preform direction, deformation under 190 psi load of 3.6% perpendicular to preform direction, hardness of 64 Shore D, coefficient of thermal expansion (in units of inch/inch/°F.$\times 10^{-6}$) of 4.7 parallel to preform direction and 2.5 perpendicular to preform direction, and shrinkage of 3.6%.

As one might expect, the various embodiments of this invention may be fabricated using a variety of dimensions and materials, depending in large part upon the size of a particular shaft and bearing housing aperture with which the device will be used.

The entire disclosure of each and every U.S. patent referred to in this specification is incorporated herein for all purposes.

This invention is susceptible to considerable variation in its practice. Therefore the foregoing description is not intended to limit, and should not be construed as limiting, the invention to the particular exemplifications presented hereinabove. Rather, what is intended to be covered is as set forth in the ensuing claims and the equivalents thereof permitted as a matter of law.

What is claimed is:

1. A mechanical face-type seal assembly for sealing space between a bearing housing wall and a rotatable shaft which extends through an aperture in said wall, said assembly comprising:
   a) a stationary seal ring having a radially extending axially facing stationary seal face;
   b) a rotary seal ring rotatable relative to said stationary seal ring and having a radially extending axially facing rotary seal face;
   c) biasing means for biasing said seal faces together; and
   d) a seal housing substantially encasing said seal rings and sized and configured to be placed around said shaft and nonrotatably inserted into said aperture, thereby creating a seal between said housing and said housing wall, said biasing means being disposed within said housing, and said seal housing further comprising:
      i) an inner stationary housing ring which comprises an axially extending first annular wall having a free end and a connecting end, and having one or more evenly and annularly displaced passageways therethrough proximate to said free end;
      ii) an outer rotary housing ring; and
      iii) one or more threaded screws sized and configured to be received respectively by one or more threaded radially extending apertures in said outer rotary housing ring and which also may be disposed respectively through said one or more passageways while so received by said one or more apertures so that, when said assembly is in an installed position, said one or more threaded screws detachably attach said outer rotary housing ring to said rotatable shaft and, when said assembly is in an uninstalled position, said threaded screws may connect said free end to said outer rotary housing ring.

2. An assembly according to claim 1 wherein said biasing means comprises a substantially annular segment of interconnected canted coils annularly aligned with said seal rings.

3. An assembly according to claim 1, further comprising:
   a) first elastomeric means, annularly disposed within an inner O-ring groove in the inner diameter of said rotary seal ring, for maintaining a seal between said rotary seal ring and said rotatable shaft; and
   b) second elastomeric means, annularly disposed within an outer O-ring groove in the perimeter of said stationary seal ring and within said seal housing, for maintaining a seal between said stationary seal ring and said seal housing.

4. An assembly according to claim 3, wherein said first elastomeric means comprises an O-ring, and said second elastomeric means comprises another O-ring.

5. An assembly according to claim 1, wherein said stationary seal ring is composed of a carbon and ceramic impregnated fluoropolymer.

6. An assembly according to claim 1 wherein said outer rotary housing ring defines one or more threaded radially extending apertures for receiving said screws through said annularly displaced passageways respectively, and wherein said outer rotary housing ring further defines a radially extending axially facing connecting face from which one or more studs axially extends to be received respectively by one or more bores in a radially extending axially facing receiving face of said rotary seal ring so as to engage said rotary seal ring in unified rotational relationship with said outer rotary housing ring.

7. An assembly according to claim 2 wherein said outer rotary housing ring defines one or more threaded radially extending apertures for receiving said screws through said annularly displaced passageways respectively, and wherein said outer rotary housing ring further defines a radially extending axially facing connecting face from which one or more studs axially extends to be received respectively by one or more bores in a radially extending axially facing receiving face of said rotary seal ring so as to engage said rotary seal ring in unified rotational relationship with said outer rotary housing ring.

8. An assembly according to claim 1, wherein said inner stationary housing ring further comprises a second annular wall connected to said first annular wall so as to create inner and outer surfaces of said inner stationary housing ring, and said inner stationary housing ring defines an annular inner surface recess formed on one side by said first annular wall and on the other side by a step along a portion of said inner surface formed by said second annular wall.

9. A mechanical face-type seal assembly for sealing space between a bearing housing wall and a rotatable shaft which extends through an aperture in said housing wall, comprising:
   a) an inner stationary housing ring including (i) an axially extending first annular wall having a free end and a connecting end, said free end being beveled at its most axial edge and said first annular wall defining a plurality of evenly and annularly displaced apertures therethrough proximate to said free end, (ii) a radially extending second annular wall which is connected at one end to said connecting end of and substantially perpendicular to said first annular wall, thereby creating inner and outer surfaces of said inner stationary housing ring, (iii) an annular inner surface recess formed on one side by said first annular wall and on the other side by a step along the portion of said inner surface formed by said second annular wall; and (iv) an annular outer surface recess within the portion of said outer surface formed by said first annular wall and proximate to the connection between said first and second walls to facilitate insertion of said assembly into said aperture, thereby creating a seal between said outer surface and said housing wall;

b) an outer rotary housing ring defining (i) one or more threaded radially extending apertures for receiving one or more threaded Allen screws through said annularly displaced apertures, said screws being sized and configured to attach said outer rotary housing ring to said rotatable shaft when installed and, when not installed, to partially extend through said annularly displaced passageways and said radially extending apertures, thereby detachably connecting said housing rings, (ii) a radially extending axially facing connecting face having one or more studs axially extending therefrom;

c) a rotary seal ring concentric with and disposed within said inner stationary housing ring, and defining (i) a radially extending axially facing receiving face having one or more bores therein for receiving said studs and engaging said rotary seal ring in unified rotational relationship with said outer rotary housing ring, (ii) a radially extending axially facing rotary seal face opposite said receiving face, (iii) an axially extending radially facing inner face which is stepped such that, when said receiving face and said connecting face are engaged with one another, said connecting face and said axially extending radially facing inner face define an inner O-ring groove, and (iv) one or more threaded radially extending apertures for receiving one or more respective threaded screws through said annularly displaced apertures so that, when said assembly is in an installed position, said threaded screws detachably attach said outer rotary housing ring to said rotatable shaft and, when said assembly is in an uninstalled position, said threaded screws may connect said free end to said outer rotary housing ring;

d) a stationary seal ring concentric with and disposed within said inner stationary housing ring, and including (i) a radially extending axially facing stationary seal face, said stationary seal face being stepped to form a seal plateau, and (ii) a second axially extending radially facing outer face having therein an outer O-ring groove;

e) a substantially annular segment of interconnected canted coils contacting said stationary seal ring on a side opposite said stationary seal face and retained in annular alignment with said seal rings by said annular inner surface recess to produce biasing force such that said rotary seal face and said stationary seal face on said seal plateau are axially urged into and maintain in sealing relation with each other;

f) first elastomeric means in said inner O-ring groove for maintaining a seal between said rotary seal ring and said rotatable shaft; and g) second elastomeric means in said outer O-ring groove for maintaining a seal between said stationary seal ring and said inner stationary housing ring.

10. A mechanical face-type seal assembly according to claim 9, wherein said first elastomeric means comprises an O-ring, and said second elastomeric means comprises another O-ring.

11. A mechanical face-type seal assembly according to claim 9, wherein said stationary seal ring is composed of a carbon and ceramic impregnated fluoropolymer.

* * * * *